United States Patent [19]

Patterson

[11] Patent Number: 5,138,183
[45] Date of Patent: Aug. 11, 1992

[54] WINDSHIELD WIPER-HEADLIGHT CONTROL CIRCUIT

[76] Inventor: Johnny F. Patterson, Rte. 6, Box 368, Clinton, N.C. 28328

[21] Appl. No.: 681,779

[22] Filed: Apr. 8, 1991

[51] Int. Cl.$^5$ .............................................. B60Q 1/04
[52] U.S. Cl. ...................................... 307/10.8; 315/82
[58] Field of Search ............... 307/10.1, 10.8; 315/77, 315/80, 82, 83; 340/457, 457.2

[56] References Cited

U.S. PATENT DOCUMENTS 3,591,845  7/1971  Vanderpoel ......................... 307/10.8
4,985,660  1/1991  Cronk .................................. 307/10.8

Primary Examiner—A. D. Pellinen
Assistant Examiner—Michael A. Friedhofer
Attorney, Agent, or Firm—Rhodes, Coats & Bennett

[57] ABSTRACT

A windshield wiper-headlight control circuit which actuates the headlights of an automobile in response to an automobile driver turning on the windshield wipers. The control circuit then maintains the headlights in an actuated state, independent of the positioning of the windshield wipers, and automatically turns-off the headlights when the automobile ignition is turned-off. The control circuit includes an ignition branch, a windshield wiper branch, and at least one headlights branch. A relay coil is located in the ignition branch and controls relay switches in the ignition branch and headlight branches. A diode controls current flow from the windshield wiper branch to the relay coil.

3 Claims, 1 Drawing Sheet

WINDSHIELD WIPER-HEADLIGHT CONTROL CIRCUIT

FIELD OF THE INVENTION

The present invention relates to windshield wiper-headlight control circuits and more particularly to a control circuit that actuates an automobile's headlights in response to a driver turning-on the windshield wipers and then maintains the headlights on when the windshield wipers are turned-off.

BACKGROUND OF THE INVENTION

Automobile drivers often do not give their full attention to operating their cars in the safest possible manner. Any of a number of preoccupations (i.e., thinking about personal or business matters, looking at the scenery while driving, putting on make-up, etc.) may divert a driver's attention and cause the driver to fail to perform one of many tasks necessary for safe driving. Reducing the number of necessary tasks that a driver is required to perform for safe driving will help limit the effect of driver inattention and increase car safety.

One important driver task necessary for safe driving is the turning on of the car's headlights when the windshield wipers are used. Rainy conditions result in limited driver visibility due to both the rain impacting the windshield and, if during daylight hours, the dusky conditions often associated with rain. These condition demand that car headlights be used in conduction with the windshield wipers, even in the daytime. During rainy weather, a driver will naturally turn-on the windshield wipers to clear his windshield of the rain. However, during daytime hours car drivers are not accustomed to turning on their headlights and may inadvertently forget to turn-on the headlights. In an attempt to increase driving safety and make drivers aware of car safety, many states now have laws requiring the use of headlights when windshield wipers are used.

To ensure that headlights are turned on when using the windshield wipers, many prior art control circuits have been developed to automatically turn the headlights on when the windshield wipers are turned-on and to likewise turn-off the headlights when the windshield wipers are turned-off. This direct operational connecting between the headlights and the windshield wipers is a helpful design feature which increases driver safety. The problem with this type of control circuit is that during intermittent rainy weather a driver in response to the changing rain conditions will periodically turn on and off his windshield wipers. This turning on and off of the windshield wipers results in the headlights being turned on and off, but during this type of weather the headlights should remain constantly on, despite the windshield wipers being periodically turned off, for optimum driver safety.

Recent prior art control circuits have been designed that actuate the headlights in response to turning on the windshield wipers, maintain the headlights on when the wipers are turned off, and then automatically turn-of the headlights when the car ignition is turned-off. This more recent type of control circuit ensures that the headlights remain constantly on during intermittent rainy weather, resulting in a better safety feature. The problem with the prior art control circuits of this type, and one probable reason that this important safety device is not more widely used, is that they are unnecessarily complicated, expensive, and not easily retrofitted.

Therefore, there is a need for a simple, economical, and easily retrofitted control circuit that will actuate the headlights in response to turning on the windshield wipers, maintain the headlights on when the wipers are turned-off, and then automatically turn-off the headlights when the ignition switch is turned-off.

SUMMARY AND OBJECTS OF THE INVENTION

The windshield wiper-headlight control circuit of the present invention automatically actuates the headlights of an automobile in response to a driver's actuation of the windshield wipers. Once the lights are actuated by turning-on the windshield wipers, the control circuit maintains the lights in an actuated state, independent of the positioning of the windshield wipers. The headlights are then automatically turned-off when the driver turns-off the car's ignition.

The control circuit includes an ignition branch, a windshield wiper branch, a headlights branch, and a parking lights branch with each branch connected in parallel. The circuit includes means for connecting a car battery to create a potential across the circuit. A relay coil is connected in the ignition branch and controls relay switches in the ignition branch, headlights branch, and parking lights branch. A current control means is connected between the ignition branch and windshield wiper branch and, along with the relay coil and associated relay switches, helps control the operation of the circuit.

It is an object of the present invention to provide a simple and economical windshield wiper-headlight control circuit that actuates the headlights in response to turning-on the windshield wipers, maintains the headlights on after the windshield wipers are turned-off, and automatically turns-off the lights when the car ignition is turned-off.

It is an object of the present invention to provide a control circuit that is easy to maintain.

Another object of the present invention is to provide a control circuit that is easily placed in new cars and also easily retrofitted into other cars.

Another object of the present invention is to provide a control circuit that can be used in conjunction with standard car headlights and windshield wipers.

Other objects and advantages of the present invention will become apparent and obvious from a study of the following description and the accompanying drawings which are merely illustrative of such invention.

DETAILED DESCRIPTION OF THE INVENTION

Figure 1:
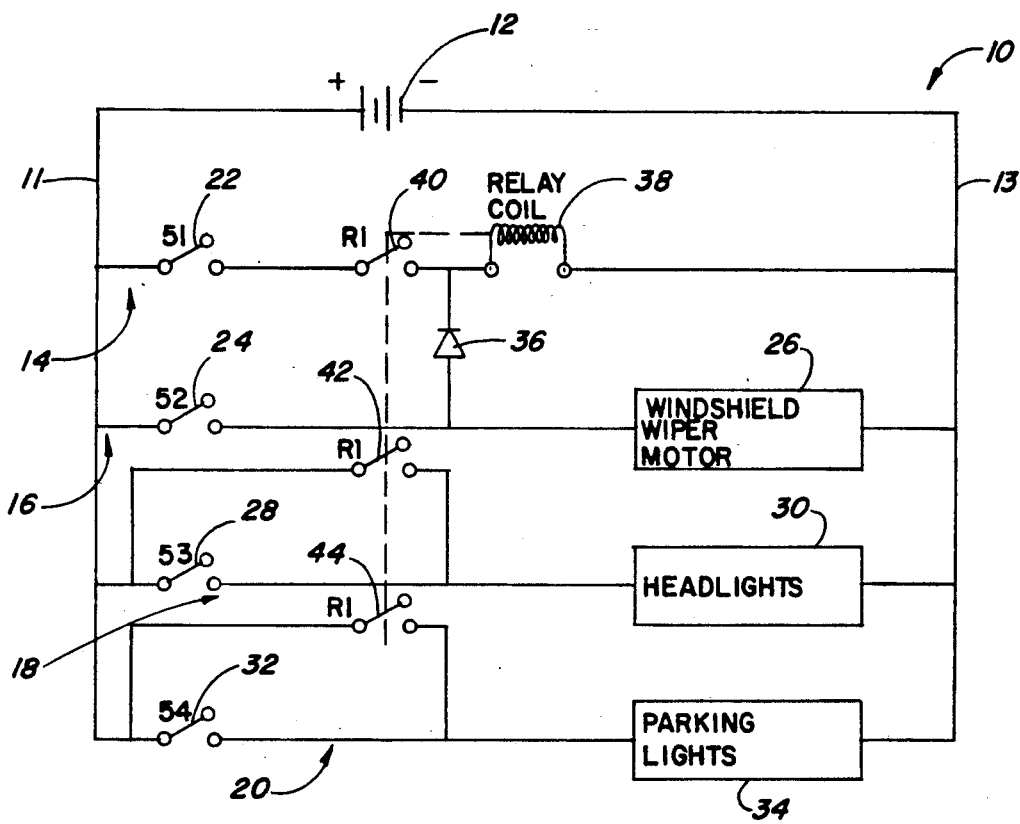
FIG. 1 is a circuit diagram of the windshield wiper-headlight control circuit of the present invention.

Referring now to the drawing, the windshield wiper-headlight control circuit of the present invention, generally designated 10, is shown therein. The control circuit 10 includes means for connecting a car battery 12 in order to create a potential across nodes 11 and 13 of the control circuit 10.

Connected in parallel between nodes 11 and 13 are ignition branch 14, windshield wiper branch 16, headlights branch 18, and parking lights branch 20. Ignition branch 14 includes an ignition switch designated as 51 or 22. Windshield wiper branch 16 includes a windshield wiper switch designated as 52 or 24, and a windshield wiper motor 26. Headlight branch 18 includes a headlight switch designated as 53 or 28, and headlights 30. Parking lights branch 20 includes a parking lights switch designated as 54 or 32, and parking lights 34.

A relay coil 38 is located in the ignition branch 14 and controls three relay switches R1. One relay switch R1 is located in series with ignition switch 22 and is designated as 40. The second relay switch is located in parallel with headlights switch 28 and designated as 42. The third relay switch is located in parallel with parking lights switch 32 and designated as 44. A diode 36 is connected between the ignition branch 14 and the windshield wiper branch 16 and, along with the relay coil 38 and associated relay switches R1, help control the operation of control circuit 10.

FIG. 1 illustrates the state of control circuit 10 (all switches 51-54 and relay switches R1 are open) when the automobile ignition, windshield wipers, headlights, and parking lights are all turned-off. Described below is how the control circuit operates to control the functioning of the windshield wipers and headlights. When a driver cranks the car's ignition to start the car, ignition switch 22 of the control circuit 10 is closed. While relay switch 40 is open, the closing of ignition switch 22 has no immediate impact on the operation of the automobile. If rain begins to fall, the car driver will actuate the windshield wipers and windshield wiper switch 24 will close.

The closing of switch 24 causes several reactions in control circuit 10. The potential between nodes 11 and 13 created by battery 12 causes current to flow through windshield wiper motor 26 and the car's wipers are thus turned-on. Current also flows through diode 36 and through relay coil 38 causing relay switches 40, 42, and 44 to close. The closing of relay switch 40 causes current to flow through ignition switch 22, relay switch 40, and then through relay coil 38. (This additional powering of relay coil 38 through ignition branch 14 will become important to the operation of the circuit when the windshield wipers are later turned-off.) The closing of relay switch 42 causes current to flow through and turn-on headlights 30. Likewise, the closing of relay switch 44 causes current to flow through and turn-on parking lights 34. Thus, the headlights 30 and parking lights 34 are automatically turned-on in response to a driver turning-on the wipers.

When the driver manually turns-off the wipers, wiper switch 24 is opened and current flow ceases through wiper motor 26 and diode 36, causing the windshield wipers to stop. Despite the lack of current flow through diode 36, the relay coil 38 is still powered. When both the ignition switch 22 and relay switch 40 of the ignition branch 14 are both closed, current passes through relay coil 38 and relay switches 40, 42, and 44 remain closed. Thus, headlights 30 and parking lights 34 remain on when the windshield wipers are turned-off.

When the driver manually turns-off the ignition, ignition switch 22 opens and breaks the closed path in the ignition branch 14 and no current flows through relay coil 38. Relay switches 40, 42, and 44 open once the relay coil 38 is depowered due to the opening of ignition switch 22. The opening of relay switches 42 and 44 interrupts current flow through headlights 30 and parking lights 34. Thus, headlights 30 and parking lights 34 are automatically turned-off when the driver turns-off the car's ignition.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A windshield wiper headlight control circuit for automatically actuating the headlights of an automobile in response to the actuation of the automobile's windshield wipers and maintaining the lights in an actuated state until the automobile's ignition is turned off, comprising: an electrical control circuit including an ignition branch having an ignition switch formed therein; a parallel windshield wiper branch having a windshield wiper switch and a windshield wipper electric motor connected therein; at least one parallel lighting branch having a light switch and a light connected therein; the ignition, windshield wiper and lighting branches being formed in parallel relationship to each other with each branch being adapted to be powered by a power supply; a relay coil and at least two associated relay switches forming a part of the electrical control circuit, the relay coil and one associated relay being connected in series with the ignition switch in the ignition branch with the second associated relay switch being connected in parallel with the light switch in the lighting branch; current control means interconnected between the windshield wiper branch and the ignition branch for actuating the relay coil in the ignition branch in response to the windshield wiper switch being closed and wherein the actuation of the relay coil results in the closing of both associated relay switches as a result of the actuation of the relay coil thereby causing the light to assume an "on" state at any time the ignition and windshield wiper switches are closed; and wherein the light remains in an "on" state until the ignition switch is opened irrespective of the on/off state of the windshield wiper switch.

2. The windshield wiper/headlight circuit control circuit of claim 1 wherein the current control means includes a diode branch connected between the windshield wiper branch and the ignition branch and wherein the diode branch joins the ignition branch at a point between the relay coil and a respective associated relay switch.

3. The electrical control circuit of claim 1 wherein the at least one lighting branch includes a headlight branch and a parking light branch with both branches being disposed in parallel relationship, and wherein each lighting branch includes its own light switch and wherein one associated relay switch is disposed in parallel to a respective light switch.

* * * * *